United States Patent [19]

Watanabe et al.

[11] Patent Number: 5,205,027
[45] Date of Patent: Apr. 27, 1993

[54] SEAL HOLDING SHUTTLE FOR FITTING ELASTIC SEAL MEMBERS TO A CALIPER

[75] Inventors: Yuji Watanabe, Tokyo; Mitsuhito Ino; Masayoshi Kojima, both of Saitama, all of Japan

[73] Assignee: Akebono Brake Industry Co., Ltd., Tokyo, Japan

[21] Appl. No.: 885,617

[22] Filed: May 19, 1992

[30] Foreign Application Priority Data

May 22, 1991 [JP] Japan .................. 3-145305

[51] Int. Cl.$^5$ .............................. B23P 19/02
[52] U.S. Cl. .......................................... 29/235
[58] Field of Search ................. 29/235, 252, 450, 451, 29/280, 229, 426.6, 446; 269/98.1

[56] References Cited

U.S. PATENT DOCUMENTS 2,086,371  7/1937  Tear ...................... 29/235
3,605,239  9/1971  Eschholz ................ 29/235

FOREIGN PATENT DOCUMENTS 2312787  9/1974  Fed. Rep. of Germany ........ 29/235

Primary Examiner—Robert C. Watson
Attorney, Agent, or Firm—Finnegan, Henderson, Farabow, Garrett & Dunner

[57] ABSTRACT

A seal holding shuttle employable for fitting elastic seal members to a caliper includes in a main body thereof an abutment plate having a cavity formed therein to receive an adjust bolt, a support member for clamping each elastic seal member between the abutment plate and the support member in the elastically bent state, four or more pins located on the inner diameter side of the elastic seal member so as to support a plurality of outward bent projections of the elastic seal member and first driving mean for displacing the abutment plate or the support member. In addition, the seal holding shuttle includes a plurality of expansive squeezing members for expanding a plurality of inward bent projections of the elastic seal member.

4 Claims, 5 Drawing Sheets

SEAL HOLDING SHUTTLE FOR FITTING ELASTIC SEAL MEMBERS TO A CALIPER

BACKGROUND OF THE INVENTION

1. Field of the Invention

The present invention relates to a seal holding shuttle employable for fitting an elastic seal member to a caliper for use in a disc brake of a vehicle.

2. Related Art

A caliper for fitting elastic sealing members to a parking brake as illustrated in FIG. 9 has been hitherto known as a caliper employable for a disc brake. Referring to FIG. 9, a caliper 50 of the aforementioned type is constructed such that an adjust bolt 52 is caused to stand upright along the center axis of a cylinder 51 at the initial stage of a fitting operation. An annular seal member 54 as shown in FIG. 7 is fitted into a seal groove 53 at the position in the vicinity of the outer end of cylinder 51 in the course of the fitting operation.

An operation for fitting an elastic seal member 54 as mentioned above has been heretofore manually performed. However, since the fitting operation should be performed such that the elastic seal member 54 is reliably and firmly fitted into the seal groove 53 while subjecting to undesirable hindrance due to the presence of the adjust bolt 52, there arises a problem that a well-trained operator is required, and moreover, each fitting operation is performed at a low efficiency.

SUMMARY OF THE INVENTION

The present invention has been made in consideration of the technical problem inherent to the conventional caliper as mentioned above. Therefore, an object of the present invention is to provide a seal holding shuttle for fitting elastic seal members to a caliper by which an elastic seal member can easily be fitted in a seal groove of a caliper by a person who is not so well-trained.

The above an other objects can be achieved by a provision of a seal holding shuttle for fitting elastic seal members to a caliper which, according to the present invention, includes in a main body thereof an abutment plate having a cavity formed thereon for receiving an adjust bolt at the central part thereof, a support member for clamping each elastic seal member between the abutment plate and the support member in the elastically bent contour, the elastic seal member exhibiting an annular contour in the restored state, four or more pins located on the inner diameter side of the elastic seal member while projecting inward of the abutment plate or the support member, the pins being arranged in the spaced relationship as seen in the circumferential direction with a predetermined distance kept between adjacent pins to support a plurality of outward bent projections of the elastic seal member in the elastically bent state, and first driving means for displacing the abutment plate or the support member in the axial direction, whereby the elastic seal member having a plurality of inward bent projections formed therewith without any occurrence of interference with the adjust bolt while exhibiting the elastically bent state is held in the clamped state or released from the clamped state by displacing the abutment plate or the support member in the axial direction.

In addition, a plurality of expansive squeezing members movably arranged on the support member to move in the forward/rearward direction and second driving means for displacing the expansive squeezing members in the axial direction are arranged in the main body of the seal holding shuttle, each of the expansive squeezing members including a fore end portion and an inclined surface portion both of which can be introduced into the hollow space defined between adjacent inward bent projections of the elastic seal member held in the elastically bent state.

An operation for holding each elastic seal member in the seal holding shuttle will be described below.

The first driving means is activated so as to determine the gap between the support member and the abutment plate sufficient to receive an elastic seal member therein, and moreover, locate the elastic seal member between the abutment plate and the support member while the elastic seal member is held in the restored state that assumes an annular contour.

While the foregoing positional state is maintained, a part of the elastic seal member is squeezed to the inner diameter side. Thus, a plurality of outward bent projections supported by the pins and a plurality of inward bent projections squeezed by the pins are alternately formed with the elastic seal member, whereby an elastically bent state is given to the elastic seal member while the outer contour of the elastic seal member is contracted. At this time, the lower surface of the elastic seal member is supported by the support member or the abutment plate which has been not displaced by the first driving means. While the elastic seal member is elastically bent in the above-described manner, the outer contour of the elastic seal member can be inserted into the cylinder of a caliper without any particular problem. In addition, a hollow space is formed at the central part of the elastic seal member so as to enable an adjust bolt to be received in the hollow space. To satisfy the aforementioned operational conditions, the elastically bent state of the elastic seal member is adjustably determined in consideration of the position where each pin is arranged in the radial direction, dimensions of each pin and the number of pins practically arranged.

Once the elastic seal member has assumed an elastically bent state, the first driving means is activated to perform a return stroke so as to hold the support member and the abutment plate in the clamped state.

Next, an operation for fitting an elastic seal member into a seal groove on a cylinder of a caliper will be described below.

The seal holding shuttle having the elastic seal member held thereon is displaced until the center axis of the cylinder of the caliper is correctly aligned with the center axis of the abutment plate. Subsequently, the abutment plate and the support member are inserted into the cylinder of the caliper so that the elastic seal member is located opposite to the seal groove on the cylinder of the caliper. At this time, the adjust bolt can be received in the cavity of the abutment plate without any particular problem.

Subsequently, the first driving means is slightly activated to perform a forward stroke so as to displace the abutment plate and the support member until the elastic seal member is released from the clamped state that it is clamped between the abutment plate and the support member. Thus, the elastic seal member is restored from the elastically bent state to the annularly restored state by its own elastic restorative force so that it is fitted into the seal groove on the cylinder of the caliper while enlarging in the radial direction. The elastically bent state of the elastic seal member annularly restored by its own elastic restorative force is adjustably determined in consideration of the position where each pin is arranged in the radial direction, dimensions of each pin and the number of pins practically arranged. At this time, the lower surface of the elastic seal member is supported by the support member or the abutment plate which has been not displaced by the first driving means.

To assure that the elastic seal member is reliably fitted into the seal groove on the cylinder of the caliper, a plurality of expansive squeezing members are actuated. Specifically, when second driving means is activated in synchronization with the activation of the first driving means to perform a forward stroke so as to displace the expansive squeezing members toward the abutment plate, whereby fore end portions and slantwise surface portions extending subsequent to the fore end portions are introduced into the hollow spaces defined by the inward curved projections of the elastic seal member and the adjust bolt so as to expand the elastic seal member in the radial direction. Thus, the elastic seal member is completely restored to the original state so that it is sufficiently fitted into the seal groove on the cylinder of the caliper.

Subsequently, the first and second driving means which have performed a forward stroke are activated again to perform a return stroke, causing the abutment plate or the support member and the expansive squeezing members to be restored to their original positions.

DESCRIPTION OF THE PREFERRED EMBODIMENTS

Now, the present invention will be described in detail hereinafter with reference to the accompanying drawings which illustrate a preferred embodiment of the present invention.

FIG. 1 to FIG. 8 illustrate a seal holding shuttle employable for fitting elastic seal members to a caliper in accordance with the embodiment of the present invention.

Figure 7:
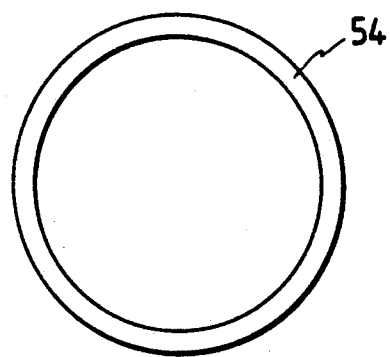
FIG. 7 is a plan view of the elastic seal member held in the restored original state.
Figure 8:
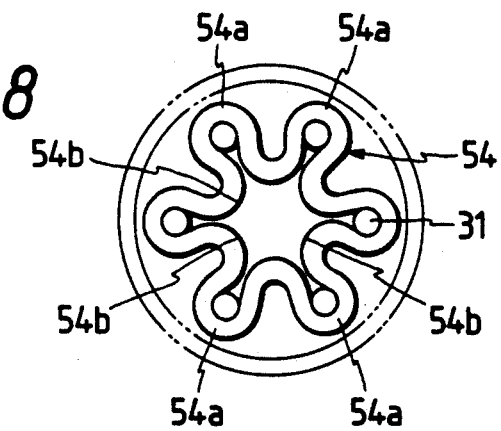
FIG. 8 is a plan view of the elastic seal member held in the elastically bent state.
Figure 9:
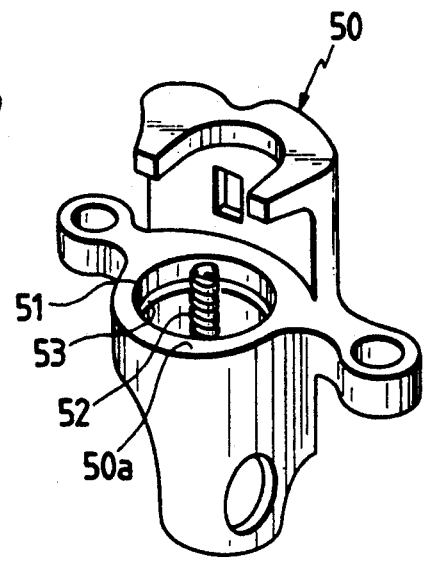
FIG. 9 is a perspective of a caliper.

The seal holding shuttle includes as essential components a seal holding sleeve 10, a seal squeezing sleeve 20 and a seal receiving sleeve 30 each of which is molded of a rubber or an elastomeric material. In practice, the seal holding shuttle serves as a unit for conveying an elastic seal member 54 having an annular contour in the restored state as shown in FIG. 7 and then fitting it to the caliper. It should be noted that the elastic seal member 54 is held in the elastically bent state as shown in FIG. 8 before it is conveyed. While the elastic seal member 54 is held in the elastically bent state as mentioned above, it alternately includes a plurality of outward bent projections 54a and a plurality of inward bent projections 54b.

Figure 1:
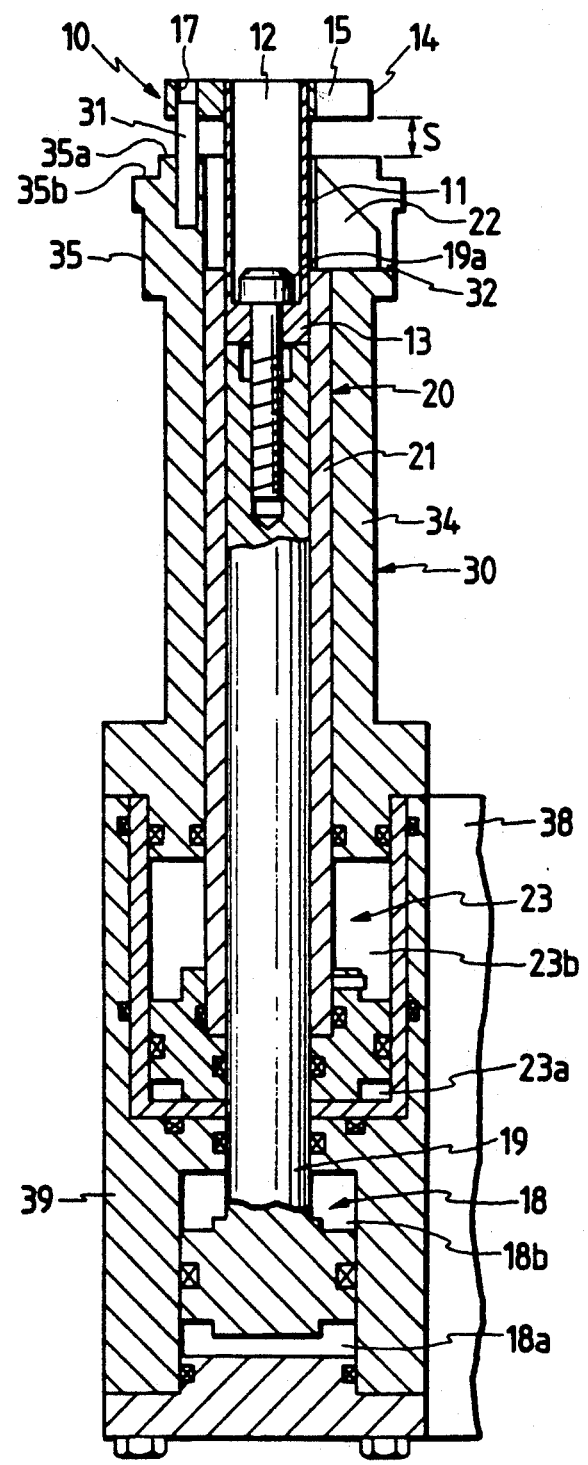
FIG. 1 is a sectional view of a seal holding shuttle for fitting elastic seal members to a caliper in accordance with an embodiment of the present invention.
Figure 2:
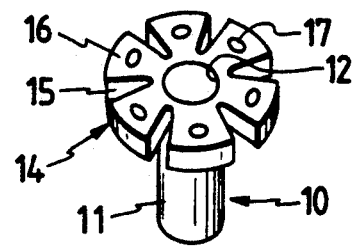
FIG. 2 is a perspective view which shows an essential component for the seal holding sleeve in accordance with the embodiment of the present invention.

As shown in FIG. 1 and FIG. 2, the seal holding sleeve 10 is constructed such that an abutment plate 14 is fixedly secured to the upper end of a cylindrical shaft 11 including a bottom 13 while having a small diameter. The central part of the abutment plate 14 and the interior of the small diameter cylindrical shaft 11 serve as a cavity 12 for receiving an adjust bolt 52 of a caliper 50. The abutment plate 14 has a configure for allowing it to be loosely inserted into a cylinder 51 of the caliper 50 and includes a plurality of sector-shaped portions 16 (usually, four to eight sector-shaped portions but practically, six sector-shaped portion in the shown case) which are divided by radially extending slots 15. The abutment plate 14 is dimensioned to support the elastic seal member 54 in the elastically bent state while the cavity 12 is kept opened. It should be added that the abutment plate 14 is dimensioned so as to permit it pass through the elastic seal member 54 which is held in the annularly restored state. Referring to FIG. 2, each of through holes 17 may be prepared in the form of a slot.

The bottom 13 of the small diameter cylindrical shaft 11 is fixedly secured to a piston rod 19 of a cylinder unit 18 serving as first driving means for the seal holding sleeve 10. As a pressurized air is introduced into a lower chamber 18a of the cylinder unit 18, the latter is activated to drive the abutment plate 14 in the upward direction as seen in FIG. 1 to perform a forward stroke while an air in an upper chamber 18b is evacuated. On the contrary, as a pressurized air is introduced into the upper chamber 18b of the cylinder unit 18, the latter is activated to drive the abutment plate 14 in the downward direction as seen in the drawing to perform a return stroke while an air in the lower chamber 18a is evacuated.

Figure 3:
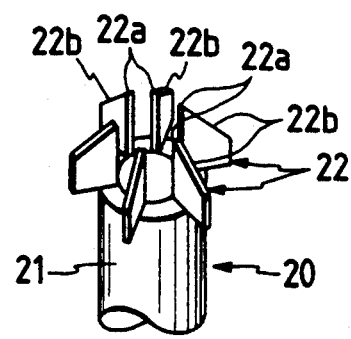
FIG. 3 is a perspective view which shows an essential component for the seal squeezing sleeve in accordance with the embodiment of the present invention.

Next, the seal squeezing sleeve 20 will be described below with reference to FIG. 1 and FIG. 3. The seal squeezing sleeve 20 includes a cylindrical shaft 21 having an intermediate diameter adapted to be slidably fitted onto the small diameter cylindrical shaft 11 of the seal holding sleeve 10 in the axial direction. A plurality of expansive squeezing member 22 arranged in the spaced relationship as seen in the circumferential direction are fixedly secured to the foremost end of the intermediate diameter cylindrical shaft 21. The number of the expansive squeezing members 22 is equalized to the number of the sector-shaped portion 16. Each expansive squeezing member 22 includes a fore end portion 22a and a slantwise surface portion 22b slantwise outward extending from the fore end portion 22a in the radial direction so as to allow it to be inserted into the slot 15 on the abutment plate 14 in the forward/rearward direction. A cylinder unit 23 serving as second driving means is secured to the bottom end of the intermediate diameter cylindrical shaft 21. As a pressurized air is introduced into a lower chamber 23a of the cylinder unit 23, the cylinder unit 23 is activated to drive the expansive squeezing members 22 in the upward direction as seen in the drawing so as to allow them to be gradually protruded outward of the slots 15 on the abutment plate 14 to perform a forward stroke while an air in an upper chamber 23 is evacuated. On the contrary, as a pressurized air is introduced into the upper chamber 23b, the cylinder unit 23 is activated to drive the expansive squeezing members 22 in the downward direction as seen in the drawing so as to allow them to be retracted away from the abutment plate 14 to perform a return stroke while an air in the lower chamber 23a is evacuated.

Figure 4:
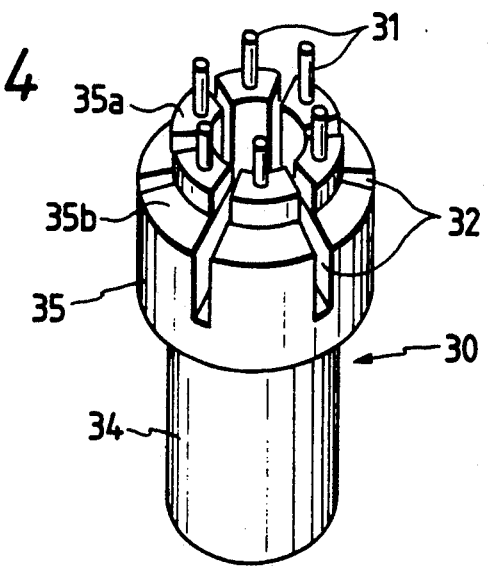
FIG. 4 is a perspective view which shows an essential component for the seal receiving sleeve in accordance with the embodiment of the present invention.

Next, the seal receiving sleeve 30 will be described below with reference to FIG. 1 and FIG. 4. The seal receiving sleeve 30 is fitted onto the intermediate diameter cylindrical shaft 21 of the seal squeezing sleeve 20 to slidably move relative to the intermediate diameter cylindrical portion 21 of the same, and includes a cylindrical shaft 34 having a large diameter at the foremost end thereof with a support member 35 integrated therewith. The support member 35 has an abutment surface 35a adapted to come in contact with the elastic seal member 54 in the elastically bent state, and an engagement surface 35b spaced away from the abutment surface 35a by a predetermined distance as seen in the radial direction comes in engagement with an engagement portion 41 of a seal accommodating sleeve 40 to be described later or a stepped surface 50a of a caliper 50. While a fitting operation is performed with the elastic seal member 54, the engagement surface 35a of the seal receiving sleeve 30 is located opposite to the abutment plate 14 as seen in the axial direction to hold the elastic seal member 54 in the elastically bent state with a gap S kept therebetween. The engagement surface 35a of the seal receiving sleeve 30 is dimensioned to be loosely inserted into the cylinder 51 of the caliper 50.

A plurality of pins 31 adapted to be slidably inserted into through holes 17 on the abutment plate 14 are arranged on the upper end of the support member 35 with a protruded attitude in the spaced relationship as seen in the circumferential direction with a predetermined distance kept between adjacent pins 31. In the shown case, the same number of pins 31 as that of the sector-shaped portions 14 of the abutment plate 14, i.e., six pins 31 are arranged on the support member 35 so as to support the outward bent projections 54a of the elastic seal member 54 in the elastically bent state. In addition, a plurality of cutout-shaped grooves 32 are formed on the support member 35 at the intermediate positions between adjacent pins 31 so as to receive the expansive squeezing members 22 of the seal squeezing sleeve 20. The bottom of the seal receiving sleeve 30 constructed as mentioned above is immovably installed on a main body 39 of the seal holding shuttle. As is apparent from the drawings, cylinders for the cylinder units 18 and 23 are formed in the main body 39 of the seal holding shuttle.

The seal holding shuttle is constructed in the above-described manner, and the main body 39 of the seal holding shuttle is immovably mounted on a shuttle supporting member 38. It should be noted that means for displacing the shuttle supporting member 38 in the leftward/rightward direction and means for displacing the same in the upward/downward direction as seen in the drawings both of which are not shown in the drawings are operatively attached to the shuttle holding member 38.

Next, an operation for holding the elastic seal member 54 on the seal holding shuttle will be described below with reference to FIG. 5.

Figure 5:
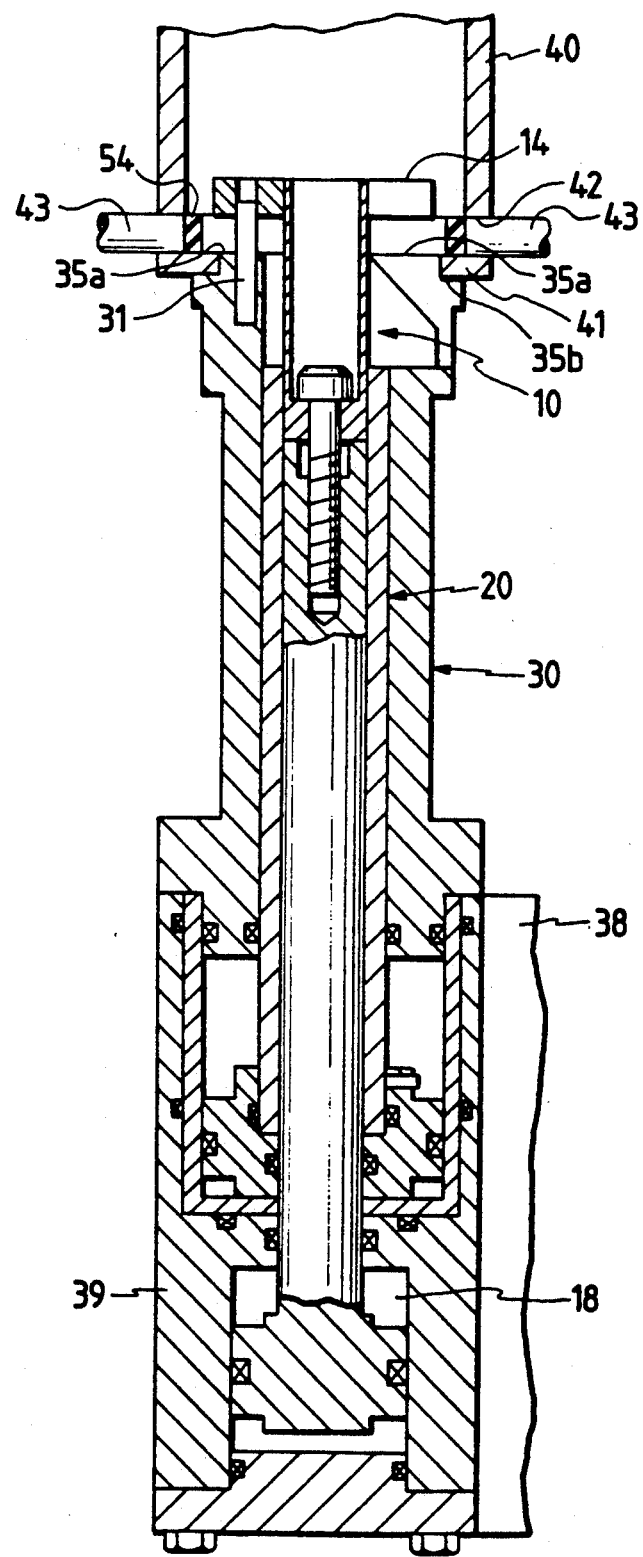
FIG. 5 is a sectional view of the seal holding shuttle, particularly illustrating a mode of operation of the seal holding shuttle.

In FIG. 5, reference numeral 40 designates a seal accommodating sleeve. When an elastic seal member 54 is supplied to the seal holding shuttle from above in the annularly restored state, it is brought in engagement with an inward extending flange-shaped engagement portion 41 at the lower end of the seal accommodating sleeve 40. Thus, a plurality of elastic seal members 54 can successively be held on the engagement portion 41 in the superimposed relationship. A plurality of through holes 42 having a diameter smaller than a height of each elastic seal member 54 are formed through the seal accommodating sleeve 40 in the radial direction with a predetermined distance kept between adjacent through holes 42 as seen in the circumferential direction at the positions corresponding to the lowermost elastic seal member 54 placed on the engagement portion 41. In the shown case, six through holes 42 are formed at the intermediate positions between adjacent pins 31. A thrust rod 43 is inserted into each through hole 42 to move in the forward/rearward direction. In practice, six thrust rods 43 are inserted into the through holes 42 in such a manner that they are driven in the forward-/rearward direction by a forward/rearward driving unit which is not shown in the drawing.

First, the seal holding shuttle is displaced by activating the means for displacing it in the leftward/rightward direction so that the center axis of the seal holding shuttle is correctly aligned with the center axis of the seal accommodating sleeve 40. Subsequently, the seal holding shuttle is displaced in the upward direction so as to allow the abutment plate 14 to be inserted into the seal accommodating sleeve 40 until the abutment surface 35a of the seal receiving sleeve 30 positionally coincides with the upper surface of the engagement portion 41. This positional coincidence can easily be achieved by bringing the engagement surface 35b of the seal receiving sleeve 30 in engagement with the lower surface of the engagement portion 41. Subsequently, the cylinder unit 18 is activated to perform a forward stroke so that the gap S between the abutment surface 35a of the seal receiving sleeve 30 and the lower surface of the abutment plate 14 of the seal holding sleeve 10 is determined so as to enable each elastic seal member 54 to be received within the hollow space defined by the gap S. At this time, not only the through holes 42 of the seal accommodating sleeve 40 but also the thrust rods 43 are located at the intermediate positions between adjacent pins 31.

When the respective thrust rods 43 are squeezed via the through holes 42 while the aforementioned positional state is maintained, a part of each elastic seal member 54 placed on the engagement portion 41 is squeezed in the inward direction by the corresponding thrust rod 43, whereby a plurality of outward bent projections 54a supported by the respective pins 31 and a plurality of inward bent projections 54b squeezed by the thrust rods 43 are alternately formed with the elastic seal member 54 to assume an elastically bent state that exhibits the contour of each elastic seal member 54 contracted as illustrated in FIG. 8. At this time, the elastic seal member 54 is subjected to deformation on the abutment surface 35a of the seal receiving sleeve 30. Thus, the elastic seal member 54 forms a hollow space at the central part thereof for permitting not only the small diameter cylindrical shaft 11 but also an adjust bolt 52 to be received in the hollow space. To satisfy the foregoing operational conditions, the elastically bent state of the elastic seal member 54 is adjustably determined in consideration of the position where each pin 31 is arranged in the radial direction, dimensions of each pin 31 and the number of pins 31 practically arranged.

Once the elastic seal member 54 has assumed the elastically bent state, the cylinder unit 18 is activated to perform a return stroke so as to hold the elastic seal member 54 in the clamped state between the abutment surface 35a of the seal receiving sleeve 30 and the lower surface of the abutment plate 14 of the seal holding sleeve 10. While the elastic seal member 54 is held in the above-described manner, the respective thrust rods 43 are retracted, and subsequently, the seal holding shuttle is displaced in the downward direction without any occurrence of interference with the seal accommodating sleeve 40.

Figure 6:
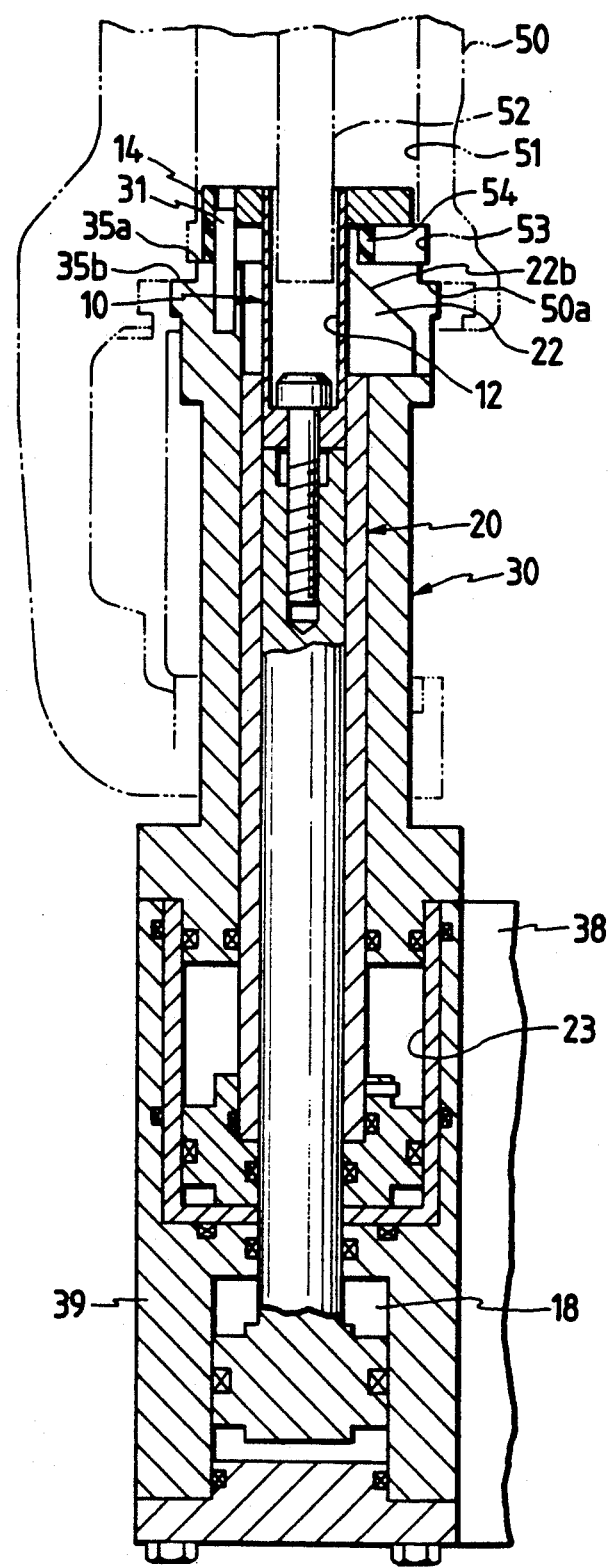
FIG. 6 is another sectional view of the seal holding shuttle, particularly illustrating a mode of operation of the seal holding shuttle.

Next, an operation for fitting the elastic seal member 54 into a seal groove 53 on a cylinder 51 of a caliper 50 will be described below with reference to FIG. 6. The cylinder 51 of the caliper 50 is held with an upright attitude by using a jig which is not shown in the drawing. While the upright attitude is maintained, the seal holding shuttle which holds another elastic seal member 54 is displaced in the leftward/rightward direction until it is located below the caliper 50.

When it is confirmed that the center axis of the cylinder 51 of the caliper 50 is correctly aligned with the center axis of the seal holding sleeve 10, the seal holding shuttle is displaced in the upward direction so that the abutment plate 14 of the seal holding sleeve 10 and the abutment surface 35a of the seal receiving sleeve 30 are inserted into the cylinder 50 of the caliper 50, and the abutment surface 35a of the seal receiving sleeve 30 positionally coincides with the lower edge of the seal groove 53 of the caliper 50. This positional coincidence can easily be achieved by bringing the engagement surface 35b of the seal receiving sleeve 30 in engagement with the stepped surface 50a of the caliper 50. At this time, the adjustment bolt 52 is received in the cavity 12 of the abutment plate 14 without any particular problem.

Subsequently, the cylinder unit 18 is slightly activated to perform a forward stroke so as to release the elastic seal member 54 from the clamped state that the elastic seal member 54 is clamped between the abutment plate 14 and the abutment surface 35a of the seal receiving sleeve 30. Thus, the elastic seal member 54 is restored from the elastically bent contour to the original annular contour by its own restorative force, whereby it is fitted into the seal groove 53 while enlarging its diameter in the radial direction. At this time, the annular seal member 54 is subjected to deformation on the abutment surface 35a of the seal receiving sleeve 30. The elastically bent state of the elastic seal member 54 which has restored to an annular contour by its own elastic restorative force can adjustably be determined in consideration of the position where each pin 31 is arranged in the radial direction, dimensions of each pin 31 and the number of pins 31 practically arranged.

To assure that the elastic seal member 54 is more reliably fitted into the seal groove 53 on the cylinder 51 of the caliper 50, the seal squeezing sleeve 20 is actuated. Specifically, the cylinder unit 23 is activated in synchronization with the activation of the cylinder unit 18 to perform a forward stroke so that the seal squeezing sleeve 20 including a plurality of expansive squeezing member 22 is displaced in the upward direction so as to allow the fore end portions 22a and the slantwise surface portions 22b of the seal squeezing sleeve 20 to be introduced into the hollow space defined by the inward bent projections 54b of the elastic seal member 54 and the adjust bolt 52 of the caliper 50 so as to forcibly expand the elastic seal member 54 and thereby sufficiently fit the elastic seal member 54 into the seal groove 53 on the cylinder 51 of the caliper 50 while it is reliably restored to the original contour. It should be added that the expansive squeezing members 22 of the seal squeezing sleeve 20 are introduced into the slots 15 on the abutment plate 14 at that time.

Subsequently, the cylinder unit 18 or the cylinder unit 23 which has performed a forward stroke is activated again to perform a return stroke so as to allow the seal holding sleeve 10 and the seal squeezing sleeve 20 to be restored to their original positions, and thereafter, the main body 39 of the seal holding shuttle is displaced in the downward direction to the position where the seal holding shuttle does not interfere with the caliper 50.

Incidentally, it suffices that each pin 31 serves to permit the elastic seal member 54 held between the abutment plate 14 and the abutment surface 35a of the seal receiving sleeve 30 to exactly exhibit an elastically bent state. In addition, it has been found that the same advantageous effects as those attainable in a case where the pins 31 stand upright on the abutment plate 14 are assured. Alternatively, a cylinder unit mounted on the main body 39 of the seal holding shuttle to displace the seal receiving sleeve 30 having a supporting member 35 secured thereto in the axial direction may be substituted for the cylinder unit 18. In a case where the seal holding shuttle is provided with a cylinder unit for displacing the seal receiving sleeve 30, it is recommendable that the positional relationship among the seal accommodating sleeve 40, the caliper 50 and the seal holding shuttle is turned over upside down such that the elastic seal member 54 is subjected to deformation on the abutment plate 14. It should of course be understood that the seal holding shuttle may unchangeably be employed for a caliper usable for a disc brake having no parking brake incorporated therein, i.e., a caliper having no adjust bolt employed therefor in contrast with the caliper having the adjust bolt 52 employed therefor in accordance with the present invention.

As is apparent from the above description, the seal holding shuttle employable for fitting elastic seal members to a caliper in accordance with the present invention offers the following advantageous effects.

(1) The seal holding shuttle assures that a fitting operation for reliably fitting and firmly elastic seal members to a caliper having an adjust bolt standing upright thereon can automatically be performed at a high efficiency.

(2) Since a plurality of outward bent projections of the elastic seal member held in the elastically bent state are supported by the corresponding pins, the elastic seal member exhibits a uniform and stable contour, and moreover, elastic restoration can easily be achieved with the elastic seal member. In addition, since the elastic seal member held in the elastically bent state is firmly clamped between a support member and an abutment plate, it can reliably be supplied and conveyed while maintaining the foregoing clamped state.

What is claimed is:

1. A seal holding shuttle employable for fitting elastic seal members to a caliper having an adjustment bolt, said seal holding shuttle comprising:

a main body;

an abutment plate having a cavity formed in said main body for receiving the adjustment bolt at the central part thereof;

a support member for clamping each elastic seal member between said abutment plate and said support member in an elastically bent state, said elastic seal member exhibiting an annular contour in a restored state;

a plurality of pins connected to one of said abutment plate and said support member; said pins being located on the inner diameter side of said elastic seal member, said pins being arranged in a spaced relationship as seen in the circumferential direction with a predetermined distance kept between adjacent pins to support a plurality of outward bend projections of said elastic seal member held in the elastically bent state; and first driving means for displacing one of said abutment plate and said support member relative to each other in an axial direction, whereby said elastic seal assembly having a plurality of inward bent projections formed therewith without any occurrence of interference with said adjustment bolt while exhibiting the elastically bent state is held in a clamped state or released from a clamped state by displacing one of said abutment plate and said support member relative to each other in the axial direction.

2. A seal holding shuttle employable for fitting elastic seal members to a caliper as claimed in claim 1, wherein a plurality of expansive squeezing members movably arranged on said support member to move in a forward-/rearward direction and second driving means for displacing said expansive squeezing members in the axial direction are arranged in said main body of said seal holding shuttle, each of said expansive squeezing members including a fore end, portion and an inclined surface portion both of which are insertable into a hollow space defined between the adjacent inward bent projections of said elastic seal member held in the elastically bent state.

3. A seal holding shuttle employable for fitting elastic seal members to a caliper as claimed in claim 1, wherein the number of said pins is more than four.

4. A seal holding shuttle employable for fitting elastic seal members to a caliper as claimed in claim 3, wherein the number of said pins is six.

* * * * *

UNITED STATES PATENT AND TRADEMARK OFFICE
CERTIFICATE OF CORRECTION

PATENT NO. : 5,205,027
DATED : April 27, 1993
INVENTOR(S) : Yuji WATANABE et al.

It is certified that error appears in the above-indentified patent and that said Letters Patent is hereby corrected as shown below:

Abstract, Front Page, line 10, change "mean" to --means--.

Claim 1, column 9, line 15, change "bend" to --bent--.

Claim 1, column 9, line 21, change "assembly" to --member--.

Claim 2, column 10, line 13, after, "fore end" delete --,--.

Signed and Sealed this

Fifteenth Day of March, 1994

BRUCE LEHMAN

*Attest:*

*Attesting Officer*    Commissioner of Patents and Trademarks